United States Patent [19]
Fujio et al.

[11] Patent Number: 5,289,913
[45] Date of Patent: Mar. 1, 1994

[54] ROLLER CONVEYOR HAVING AN EXPANDABLE AND CONTRACTIBLE FLEXIBLE BODY DRIVE CORRECTION

[75] Inventors: Yoshihiko Fujio, Komaki; Shigetsugu Nakase, Shiga, both of Japan

[73] Assignee: Daifuku Co., Ltd., Osaka, Japan

[21] Appl. No.: 16,518

[22] Filed: Feb. 11, 1993

[30] Foreign Application Priority Data

Feb. 24, 1992 [JP] Japan .................................. 4-035482
Jul. 14, 1992 [JP] Japan .................................. 4-185596
Jul. 14, 1992 [JP] Japan .................................. 4-185597

[51] Int. Cl.⁵ ............................................. B65G 13/06
[52] U.S. Cl. ..................................... 198/780; 198/789
[58] Field of Search ............... 198/780, 781, 788, 789, 198/790

[56] References Cited

U.S. PATENT DOCUMENTS

| | | | |
|---|---|---|---|
| 4,815,588 | 3/1989 | Katsuragi | 198/789 X |
| 5,080,219 | 1/1992 | Imai et al. | 198/789 X |
| 5,090,558 | 2/1992 | Hatouchi | 198/781 |
| 5,129,507 | 7/1992 | Maeda et al. | 198/789 X |
| 5,161,672 | 11/1992 | Fukuyama | 198/781 X |

*Primary Examiner*—Cheryl L. Gastineau
*Attorney, Agent, or Firm*—Barnes, Kisselle, Raisch, Choate, Whittemore & Hulbert

[57] ABSTRACT

A roller conveyor comprising a driven section (18) freely rotatably mounted on one end of a roller shaft (16) a sleeve member freely rotatably mounted on the same one end through a bearing device (31), a roller body (24) freely rotatably fitted on the driven section (18) and the other end of the roller shaft (16), the sleeve member (19) being provided with a flexible body (26) adapted to contact the inner surface (24a) of the roller body (24) when contracted and to press against the inner surface (24a) and driven section (18) when expanded, and a fluid feed and delivery passage which opens to the interior of the flexible body (26) and which extends from the roller shaft 16 to the sleeve member (19). Thus, when the flexible body is expanded to press against the inner surface of the roller body and the driven section, the torque in the driven section can be transmitted to the roller body through the flexible body, thereby causing the forced rotation of the roller body. When the pressure in the flexible body is released, the flexible body is contracted to contact the inner surface of the roller. Since the sum of the frictional resistance of the seal device and the contact resistance of the flexible body is high, the roller body can be made integral with the roller shaft and its rotation can be completely stopped.

2 Claims, 12 Drawing Sheets

ROLLER CONVEYOR HAVING AN EXPANDABLE AND CONTRACTIBLE FLEXIBLE BODY DRIVE CORRECTION

FIELD OF THE INVENTION

The present invention relates to a roller conveyor built in a shelf device or installed on a floor.

BACKGROUND OF THE INVENTION

As for a roller conveyor using driven rollers, there is a construction as found in, e.g., U.S. Pat. No. 5,080,219. This prior art construction comprises a roller shaft supported in a frame, a freely rotatable roller fitted on said roller shaft, a flexible body attached to said roller shaft and adapted to be expanded and contracted for contact with and separation from the inner surface of said roller body, a fluid feed and delivery passage which opens to the interior of said flexible body through said roller shaft, and a driven section provided on said roller shaft.

According to this prior art construction, torque is imparted to the driven section, whereby the flexible body is integrally rotated. In this state, fluid is fed to the flexible body through the fluid feed and delivery passage so as to expand the flexible body by the fluid pressure until it abuts (or presses) against the inner surface of the roller body, thereby integrally rotating the roller body to convey articles. When the pressure in the flexible body is released through the fluid feed and delivery passage, the flexible body is contracted to separate from the inner surface of the roller body, whereupon the torque transmission to the roller body is interrupted; thus, the rotation of the roller body is stopped.

In the case of the prior type described above, however, when the flexible body is contracted to separate from the inner surface of the roller body, the roller body does not stop but continues rotating owing to the frictional resistance of the bearings and inertial force. Therefore, when the roller body supports articles to be conveyed which are light in weight, it continues conveying them.

DISCLOSURE OF THE INVENTION

An object of the present invention is to provide a roller conveyor designed so that as soon as the forced rotation of the roller is stopped, the roller is brought to a halt.

To achieve said object, the roller conveyor of the present invention comprises a driven section freely rotatably fitted on one end of a roller shaft supported in a frame, a sleeve member freely rotatably supported on said one end through a seal device, a roller body freely rotatably supported between said driven section and the other end of said roller shaft, a flexible body mounted on said sleeve member and adapted to contact the inner surface of the roller body when contracted and to press against both the inner surface of the roller body and the driven section when expanded, and a fluid feed and delivery passage which opens to the interior of said flexible body and which extends from said roller shaft to the sleeve member.

According to such arrangement of the present invention, with torque imparted to the driven section, fluid is fed to the flexible body through the fluid feed and delivery passage, and the fluid pressure expands the flexible body to press the latter against both the inner surface of the roller and the driven section, whereby the torque in the driven section is transmitted to the roller body through the flexible body, thereby causing the forced rotation of the roller body.

Further, when the pressure in the flexible body is released through the fluid feed and delivery passage, the flexible body is contracted to stop pressing against the inner surface of the roller body but it is contacted with the inner surface of the roller body. At this time, since the sum of the frictional resistance of the seal device and the contact resistance of the flexible body is greater than the frictional resistance of the bearing device of the roller body, the roller body becomes integral with the roller shaft and hence its rotation is completely stopped.

One embodiment of the present invention includes a cover member which covers one end of the roller shaft from above said driven section, the upper surface of said cover member being positioned below the level of the transport plane defined by the group of rollers.

Another embodiment of the invention includes brackets supporting the roller shaft of said roller and disposed on a pair of side frames, a driving body operatively connected to said driven section from below, and a cover member which covers one end of the roller shaft from above said driven section, the upper surface of said cover member being positioned below the level of the transport plane defined by the group of rollers.

According to the arrangement of the first embodiment described above, the driving body imparts torque to the driven section, the torque being then transmitted to the roller to cause the forced rotation of the latter. The cover positioned above the driven section to cover one end of the roller shaft prevents foreign things from being entangled in the driven section or roller shaft. Further, since the upper surface of the cover member is positioned below the level of the transport plane, a pusher device and the like can be disposed, without being interfered with by the cover member, in a branch or a junction in the transport path.

According to the arrangement of the second embodiment described above, the position of the roller shaft supported by the brackets is above the upper surface of the side frames, thus providing a large space between the transport plane and the upper surfaces of the side frames. Therefore, utilization of this space enables the engaging dog of a fork or transfer robot to act directly on articles to be conveyed or a transfer conveyor to be disposed at right angles with the transport path.

In still another embodiment of the invention, the fluid feed and delivery passage is opened at least at one end surface of the roller shaft, and a fluid coupling is inserted into this opening axially of the roller shaft and thereby installed.

According to this arrangement, with torque imparted to the driven section, fluid is fed to the flexible body through the fluid feed and delivery passage and its pressure expands the flexible body, whereby the torque in the driven section is transmitted to the roller body through the flexible body to cause the forced rotation of the roller body.

When the intended transport is being effected, the load on the roller body repetitively changes, but since the roller shaft is supported in the main frame and no load is transmitted to the fluid coupling, the sealed state in the region where the fluid coupling is fitted in the roller shaft remains unchanged.

DESCRIPTION OF THE PREFERRED EMBODIMENTS

An embodiment of the present invention will now be described with reference to FIGS. 1 through 5.

The numeral 1 denotes a conveyor frame comprising a pair of side frames 2, a base frame 3 (FIG. 4) connecting the lower portions of said side frames 2 as by bolts, and leg frames 4 connected to the lower portion of said base frame 2 as by bolts. Each of the opposed inner surfaces of the side frames 2 is formed with an L-shaped guide 5 and also formed in the upper region with a dovetail groove 7 allowing slide movement of a nut 6. Disposed on the inner surface of one side frame 2 are a pair of vertically spaced guide rails 8 and 9 extending lengthwise of the frame.

A support 10 is installed on each of the inner surfaces of the side frames 2, fitted in said guide 5 so that its position can be changed (by sliding) lengthwise of the frame, said support 10 being fixed in a changed position by screwing a bolt 11 into said nut 6. Each support 10 is formed at its inner surface with a recess 12 which is open both upwardly and inwardly, and a roller 15 is freely rotatably installed between the two supports 10 by utilizing these recesses 12. That is, a roller shaft 16 has a cap 17 of rigid rubber is fitted on one end thereof and a parallel portion 16a formed on the other end. The cap 17 and parallel portion 16a are dropped from above into said recesses 12, whereby the roller shaft 16 is nonrotatably supported.

A driven section 18 and a sleeve member 19 are freely rotatably fitted on one end of the roller shaft 16, with the driven section 18 disposed on the outer side. That is, the driven section 18 comprises a sleeve portion 18A freely rotatably supported on the roller shaft 16 through a bearing device 20 and a bushing 21, and a sprocket 18B integral with one end of said sleeve portion 18A. The bushing 21 is disposed between the cap 17 and the bearing device 20, thereby preventing axial deviation of the driven section 18. The sleeve member 19 is freely rotatably supported on the roller shaft 16 through a pair of bearing devices 22. The sleeve member 19 is separate from the driven section and freely rotatable independently of the latter, with a spacer 23 interposed between it and the driven section 18.

A cylindrical roller body 24 is freely rotatably installed to extend between the driven section 18 and the other end of the roller shaft 16. That is, two bearing devices 25 are installed, one in the sleeve portion 18A of the driven section 18 and the other in the other end of the roller shaft 16, with the roller body 24 mounted between these bearing devices 25. Each bearing device 25 comprises an annular case 25A fixedly fitted in the end of the roller body 24, a number of balls 25C disposed on the outer side of said annular case 25A through an outer ring 25A, and an inner ring 25D.

A rubber tube 26, which is an example of a flexible body adapted to contact the inner surface 24a of the roller body 24 when contracted and to press against the inner surface 24a of the roller body 24 and the outer surface 18a of the driven section 18 when expanded, is fitted on the sleeve member 19. That is, the rubber tube 26 is fitted at one end thereof on one end of the sleeve member 19 and fixed thereon by a band 27A and turned inside out toward the other end of said sleeve member and fitted at the other end thereof on the other end of the sleeve member 19 and fixed therein by a band 27B, with the turned-back end being disposed adjacent the driven section 18 and integral with the sleeve member 19, thus forming a pressing chamber 28. The rubber tube 26 has a thick portion 26a adapted to abut against the inner surface 24a.

A fluid feed and delivery passage 30 which opens to the pressing chamber 28 of the rubber tube 26 is formed to extend through the roller shaft 16 and sleeve member 19. That is, the fluid feed and delivery passage 30 comprises a shaft channel 30a extending centrally through the roller shaft from one end to the intermediate region thereof and radially opening, an annular channel 30b formed between the outer surface of the roller shaft 16 and the inner surface of the sleeve member 19 to ensure permanent communication of said shaft channel 30a therewith, a sleeve channel 30c formed in the sleeve member 19 to communicate the annular channel 30b with the pressing chamber 28, and a pipe channel 30d formed in said cap 17 to communicate with one end of said shaft channel 30a.

A seal device 31 is interposed between the roller shaft 16 and the sleeve member 19 to define the annular channel 30b which is part of the fluid feed and delivery passage 30. The seal device 31 is formed with a through-hole 32 which establishes fluid communication between the annular channel 30b and the sleeve channel 30c. Further, the seal device 31 is in the form of a flexible member fixed to the inner surface of the sleeve member 19 and slidable on the outer surface of the roller shaft 16.

Figure 3:
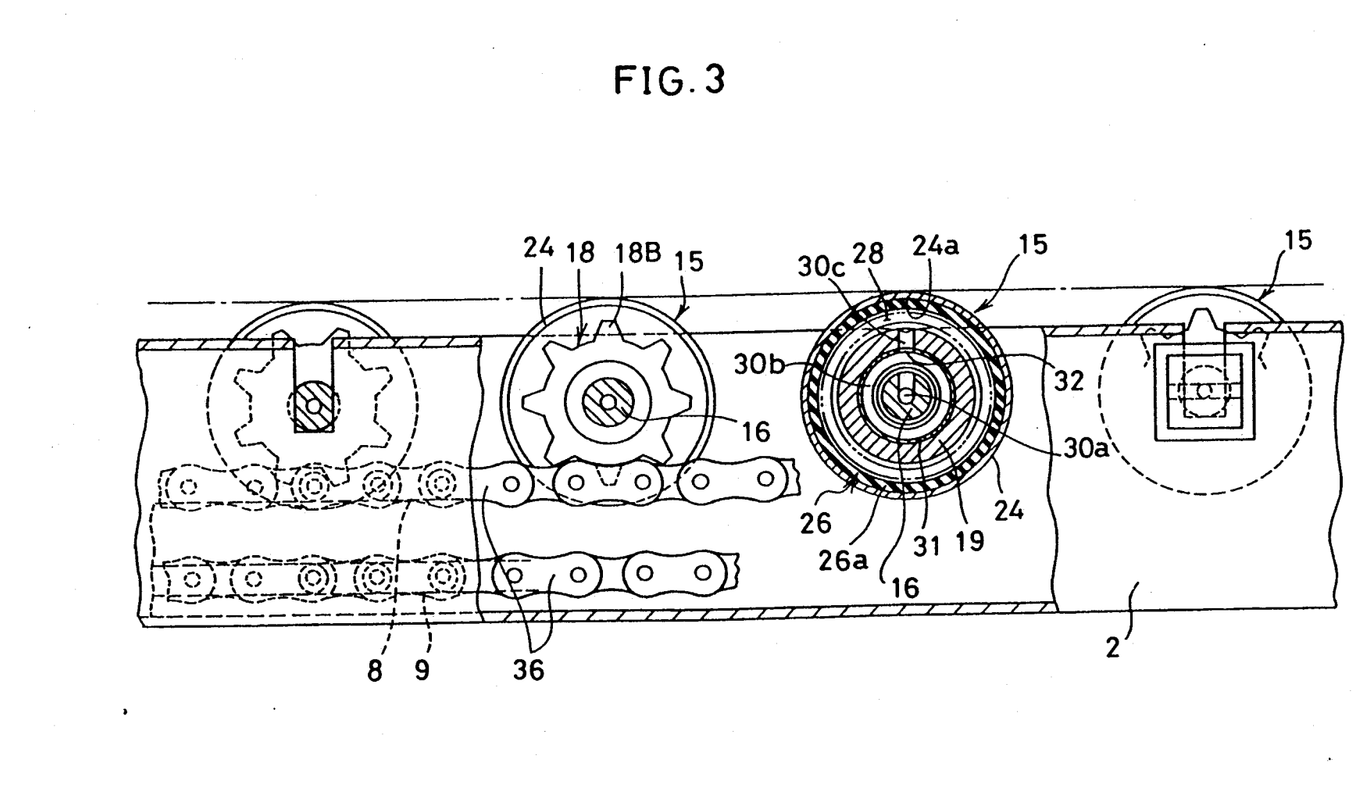
FIG. 3 is a side view, partly broken away, of the principal portion of said roller conveyor.
Figure 4:
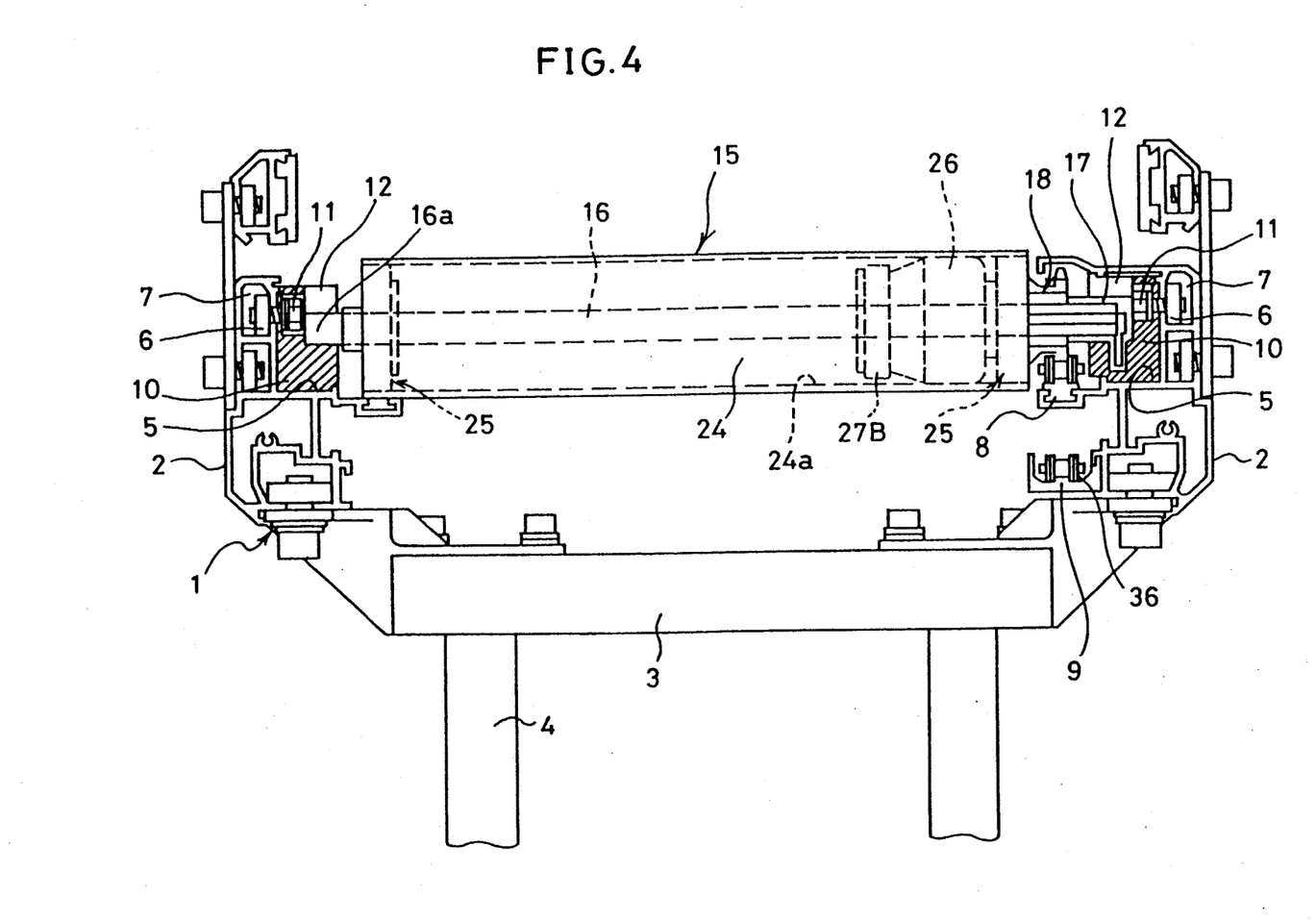
FIG. 4 is a front view, in longitudinal section, of said conveyor.

A chain 36, which is an example of a driving body, is disposed such that its upper run engaging the sprocket 18B from below is supported and guided by the upper rail 8 and so is its lower run by the lower guide rail 9 (FIG. 3). The chain 36 is installed under tension between a driving sprocket 37 and driven sprockets 38 as by guide sprockets 39 and the driving sprocket 37 is operatively connected to a motor 40. The numeral 41 denotes a transport path, and 42 denotes loads to be transported, said loads being handled by using pallets 43.

Figure 5:
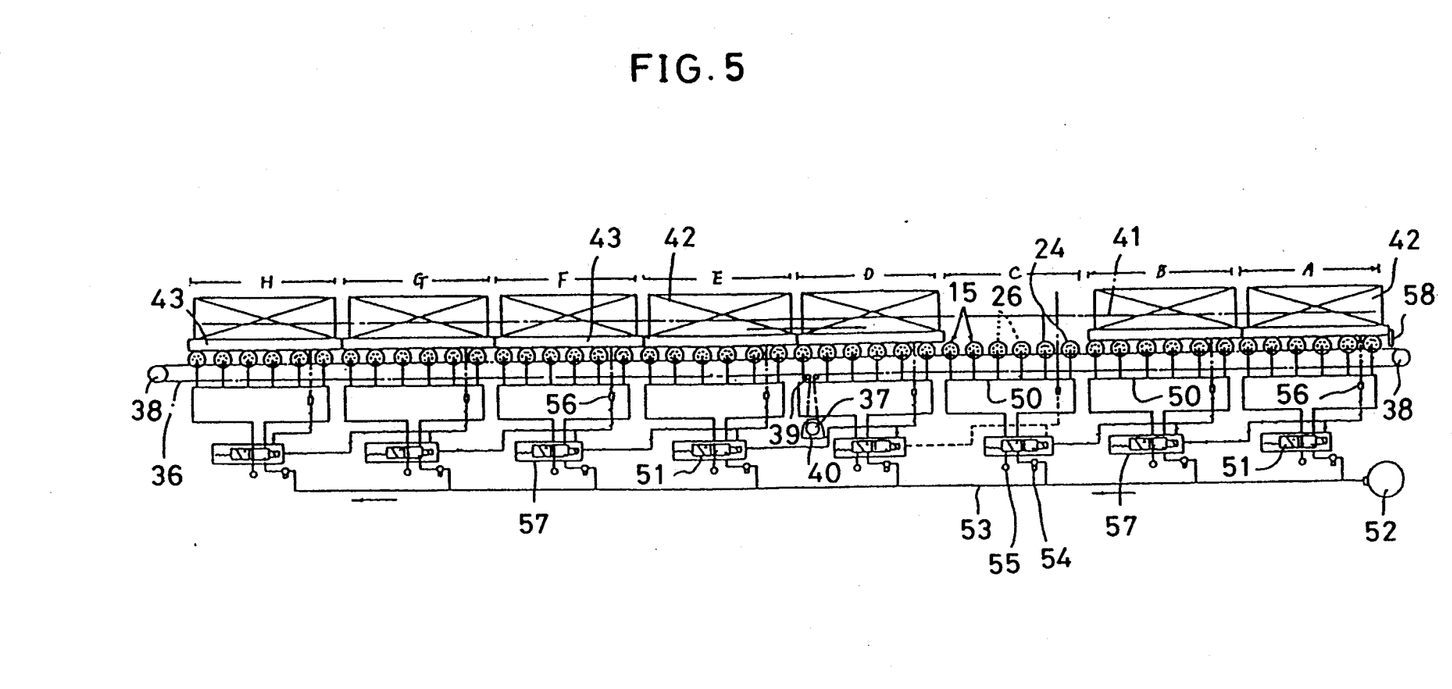
FIG. 5 is a schematic side view, showing the state of of use of said conveyor

As shown in FIG. 5, the roller conveyor constructed in the manner described above has a plurality of groups, eight groups A, B, C, D, E, F, G, H in the embodiment, of rollers 15, each group consisting of six rollers, disposed side by side in the direction of transport, and rubber tubes 26 are adapted to be expanded for each of the groups A through H. That is, each group has a feed and delivery hose 50 having a series combination of pipe channels 30d, and these feed and delivery hoses 50 are connected to a common feed hose 53 from a feed device 52 through respective solenoid valves 51 so that the fluid communication can be made and broken individually for each group. The numeral 54 denotes a regulator and 55 denotes a silencer.

Disposed downstream of each of the groups A through H is a photoelectron switch 56 which is an example of a load detector. This system is so arranged that in two adjacent groups as seen in the direction of transport, if the photoelectron switch 56 for the upstream group effects detection of load while the photoelectron switch 56 for the downstream group effects nondetection of load, the rubber tubes 26 for the two groups are simultaneously pressed (by establishing communication between the feed hose 53 and the feed and delivery hoses 50) and that if the photoelectron switches 56 for the two groups simultaneously effect detection or nondetection, the rubber tubes 26 are simultaneously allowed to stop pressing (by breaking the communication between the feed hose 53 and the feed and delivery hoses 50). Therefore, the solenoid valves 51 are built in their respective control units 57. Further, the most downstream group A alone is so designed that if its photoelectron switch 56 effects detection, the rubber tube 26 is allowed to stop pressing. The numeral 58 denotes a stop.

Transport operation of loads 42 will now be described.

Figure 2:
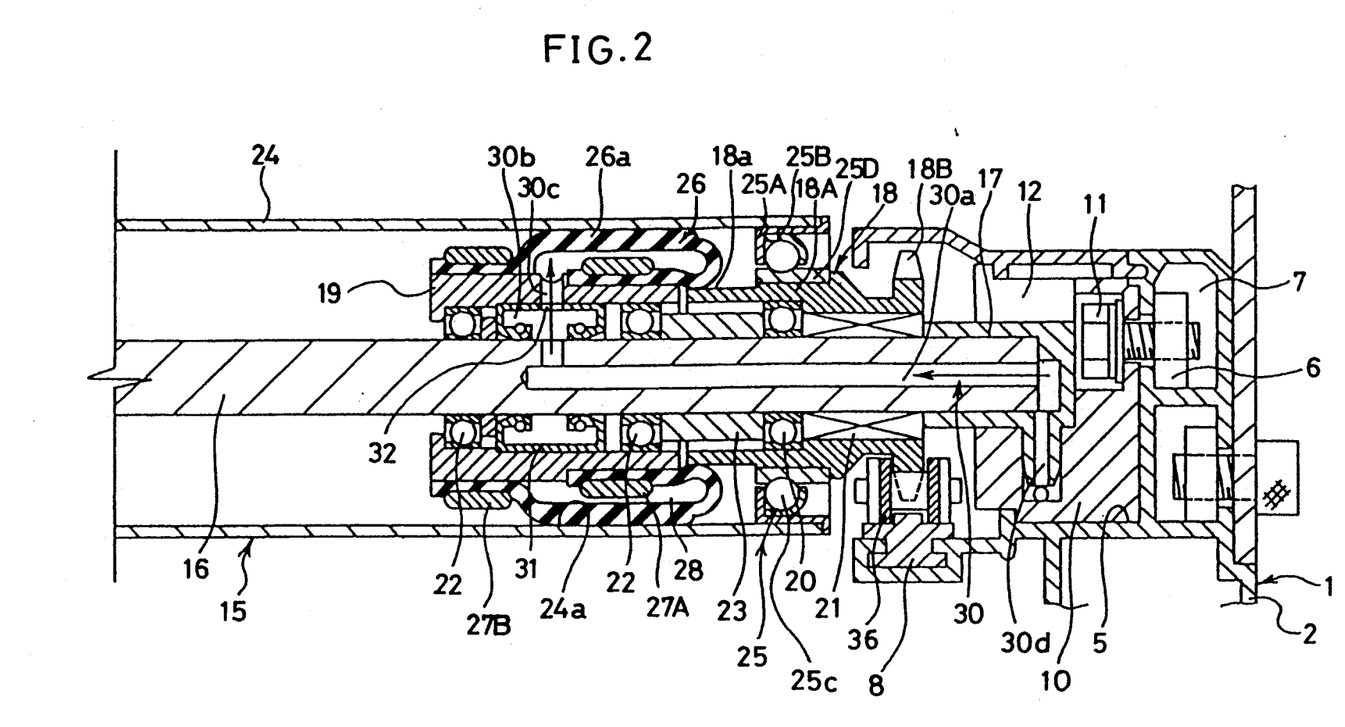
FIG. 2 is a front view, in longitudinal section, showing the transmission state of the transmission device of said roller conveyor.

The solid lines in FIGS. 2 and 3 indicate that the rubber tube 26 has been expanded to press against the outer surface 18a of the driven section 18 and against the inner surface 24a of the roller body 24 by the pressure of air (fluid) fed thereto through the fluid feed and delivery passage 30 when the solenoid valve 51 is switched to connect the feed hose 53 to the fluid feed and delivery hose 50. The chain 36 is driven all the time by the motor 40 and hence the driven section 18 is being rotated around the axis of the roller shaft 16 by the sprocket 18B engaged by the chain 36. And the rubber tube 26 pressed against the outer surface 18a of the driven section 18 is rotated integrally with the sleeve member 19 around the axis of the roller shaft 16. Further, since the thick portion 26a of the rubber tube 26 is pressed against the inner surface 24a of the roller body 24, the roller body 24 is also being integrally rotated. Thus, the pallet 43 supported between rollers 15 is transported in the transport path 41 as it is receiving a transporting force produced by the forced rotation of the group of rollers 15.

When torque is being transmitted as described above, the driven section 18, rubber tube 26 and roller body 24 are integrated together and the sleeve member 19 having the rubber tube 26 attached thereto is concomitantly rotated. Therefore, there is no possibility of overload being produced at the rubber bands 27A and 27B which attach the rubber tube 26 to the sleeve member 19. Further, when the roller shaft 16 was long-sized, it deflected such that its central region was positioned deepest. In the case where the rubber tube 26 is disposed at one end of the roller shaft 16 as shown in the embodiment, the rubber tube 26 is allowed to expand at the position where such deflection is not so great.

The rotation of the driven section 18 and sleeve member 19 described above is smoothly and stably effected through the bearing devices 20 and 22 and so is the rotation of the roller body 24 through the bearing device 25. At this time, the seal device 31 is also rotated together with the sleeve member 19 while sliding on the roller shaft 16, so that there is no possibility of the air leaking from the annular channel 30b.

Figure 1:
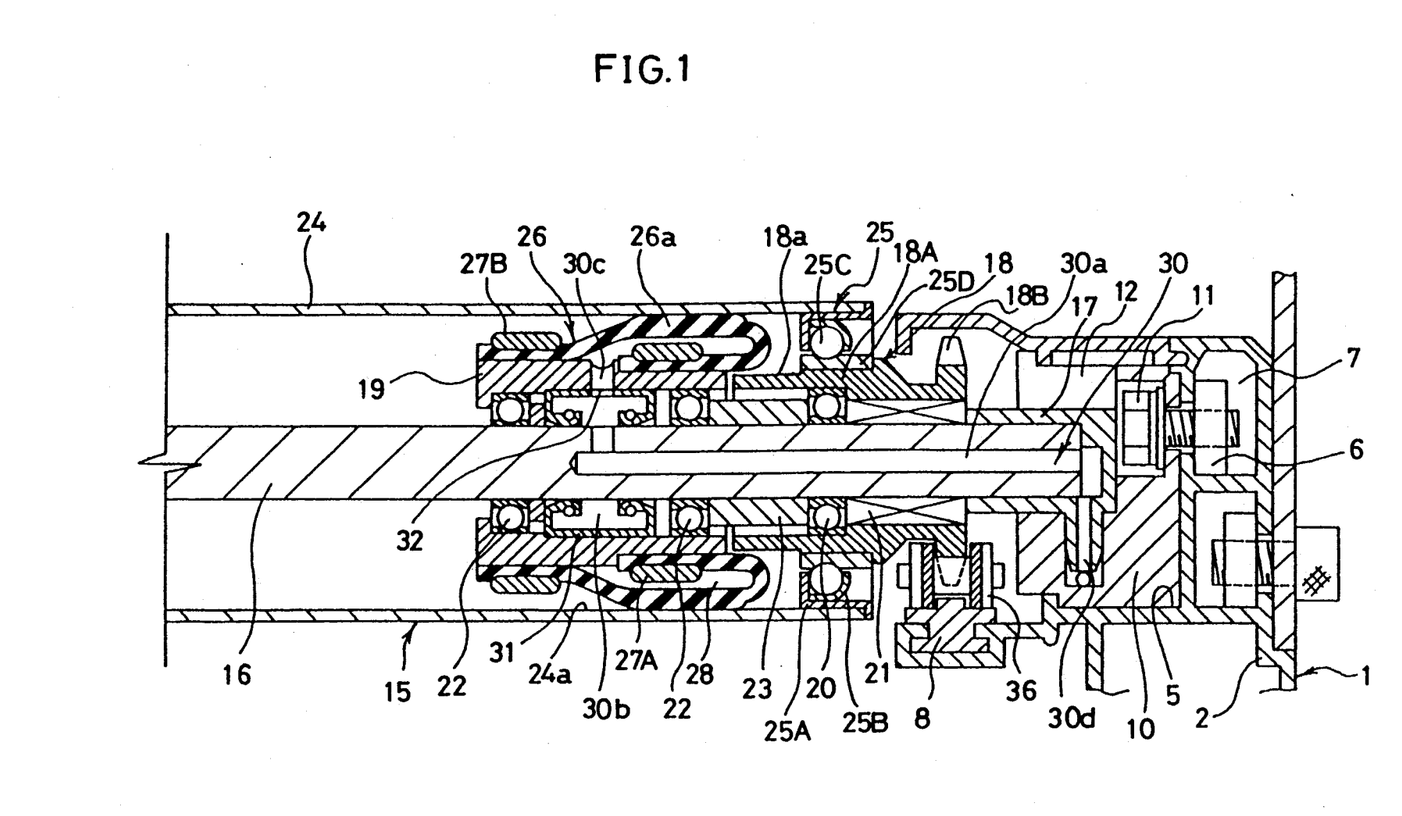
FIG. 1 is a front view, in longitudinal section of the transmission device of a roller conveyor, showing an embodiment of the present invention.

When the solenoid valve 51 is switched to isolate the feed and delivery hose 50 from the feed hose 53, the pressure in the rubber tube 26 is released and, as shown in phantom lines in FIGS. 1 and 3, the rubber tube 26 contracts by its own elasticity to stop pressing against the outer surface 18a of the driven section 18 and against the inner surface 24a of the roller body 24 and now the thick portion 26a is contacted with the inner surface 24a of the roller body 24. At this time, since the sum of the frictional resistance due to slide movement of the seal device 31 and the contact resistance of the rubber tube 26 is greater than the friction resistance of the bearing device 25 of the roller body 24, the roller body 24 becomes integral with the roller shaft 16, so that the rotation of the roller body 24 is completely stopped, resulting in stoppage of transport.

The roller conveyor performs transport of pallets 43 (loads 42) basically in the manner described above. In reality, transport is controlled on the basis of the photoelectron switch 56 effecting detection or nondetection. That is, with the transport path 41 being empty, when the upstream group H is loaded with a pallet 43 as by a fork lift truck, the photoelectron switch 56 for the group H effects detection but the photoelectron switch 56 for the group G effects nondetection, with the result that the operation of the control units 57 and solenoid valves 51 causes the rubber tubes 26 to expand to effect pressing, whereby the roller bodies 24 in the groups H and G are driven in turn to transport the pallet 43 from the group H to the group G.

When the pallet 43 enters the group G, the photoelectron switch 56 for this group effects detection, but the photoelectron switch 56 for the group F effects nondetection, so that the rubber tubes 26 for the groups G and H are caused to effect pressing, thereby transporting the pallet 43 from the group G to the group F. The pallet which is transported successively downstream in this manner abuts against the stop 38 and stops and it is stored at the group A. As this pallet 43 is detected by the photoelectron switch 56, the rubber tube 26 for the group A is released to stop pressing.

The second pallet 43 is likewise transported, abutting against the pallet 43 staying in the group A and is stored at the group B. At this time, although detection is effected in the group B, detection is being effected also in the group A; therefore, the rubber tube 26 for the group B is also released to stop pressing.

Suppose that pallets 43 have been stored at all groups A through H in this manner and that all rubber tubes 26 have been released to stop pressing. In this state, when the pallet 43 at the group A is taken out, the photoelectron switch 56 for the group A comes to effect nondetection, with the result that the rubber tubes 26 for the groups A and B effect pressing, thereby transporting the pallet 43 at the group B to the group A. Thereupon, the photoelectron switch 56 for the group B comes to effect nondetection, causing the rubber tubes 26 for the groups B and C to effect pressing, thereby transporting the pallet 43 at the group C to the group B. Repetition of such operation effects transport of pallets 43.

In the above embodiment, the type has been shown in which pallets 43 are successively transported using a plurality of groups A through H; however, another type may be employed in which a pallet 43 fed to the upstream end of the transport path 41 is transported to the downstream end at a stroke. Further, in the above embodiment, a plurality of rollers 15 have been arranged to define the transport path 41; however, a non-driven roller conveyor comprising freely rotatable rollers may be installed laterally of the roller conveyor shown in the embodiment to cooperate with the latter to define the transport path 41. Further, in the embodiment described above, a floor conveyor type in which a roller conveyor is installed on a floor has been shown; however, a conveyor shelf type in which a number of conveyors are arranged in shelf form may be used.

Figure 6:
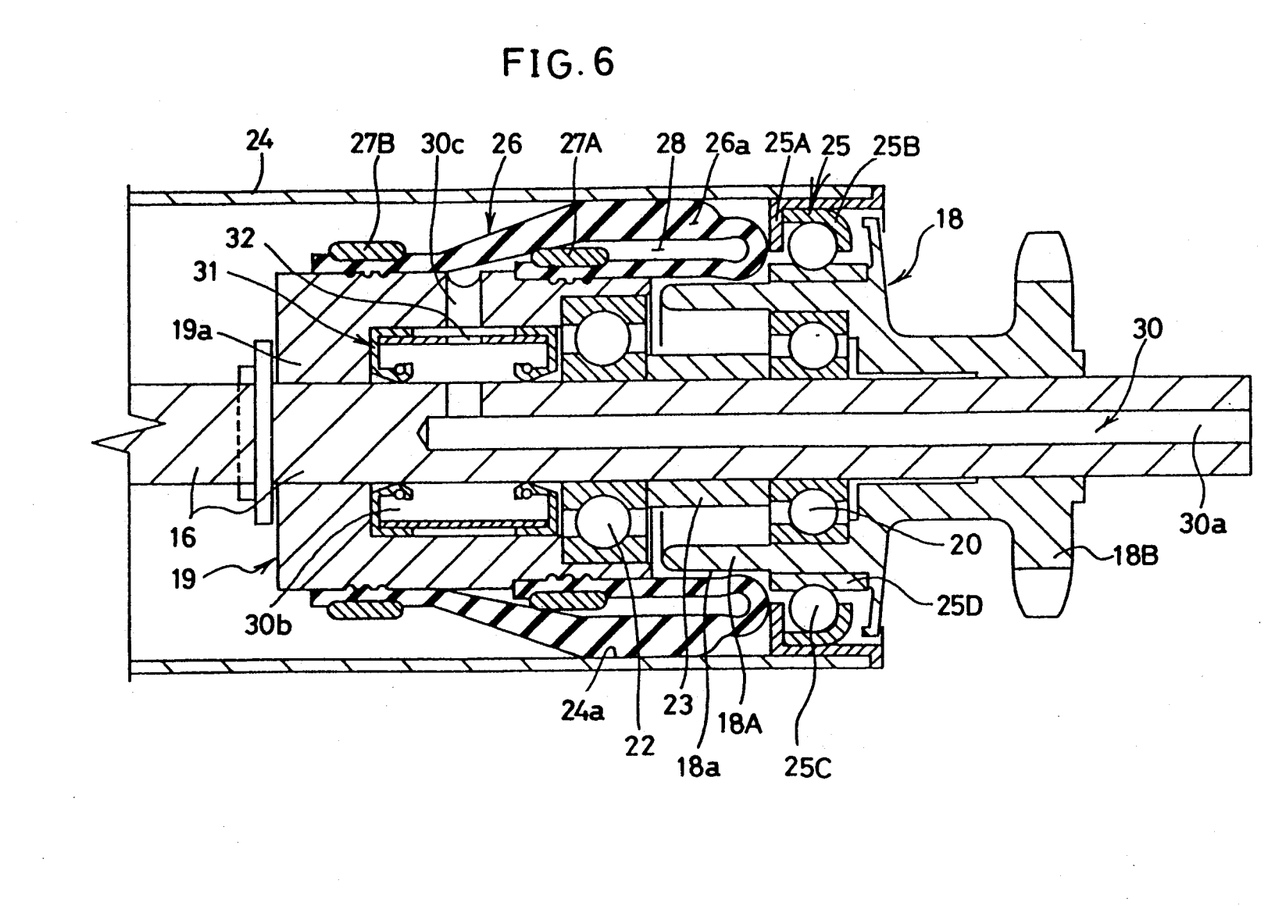
FIG. 6 is a front view, in longitudinal section, of the transmission device of a roller conveyor, showing another embodiment of the invention.

FIG. 6 shows another embodiment of the present invention. The end of the sleeve member 19 remote from the driven section 18 is formed as a small-diameter portion 19a fitted on the roller shaft 16, said sleeve member 19 being fitted on the roller shaft 16 for free rotation by means of said small-diameter portion 19a and a single bearing device 20.

According to the above-mentioned arrangement of the invention, in the state in which torque is imparted to the driven section, fluid is fed into the flexible body through the fluid feed and delivery passage and the fluid pressure expands the flexible body to cause the latter to press against the inner surface of the roller body and against the driven section, whereby the torque in the driven section can be transmitted to the roller body through the flexible body, thus causing the forced rotation of the roller body to effect transport of articles to be conveyed.

When the pressure in the flexible body is released through the fluid feed and delivery passage, the flexible body is contracted to stop pressing against the driven body and the inner surface of the roller body while the flexible body is placed in contact with the inner surface of the roller body. At this time, since the sum of the frictional resistance of the seal device and the contact resistance of the flexible body is greater than the friction resistance, the roller body can be made integral with the roller shaft and its rotation can be completely stopped and so can the transport of the article.

Another embodiment of the invention will now be described with reference to the drawings.

Figure 11:
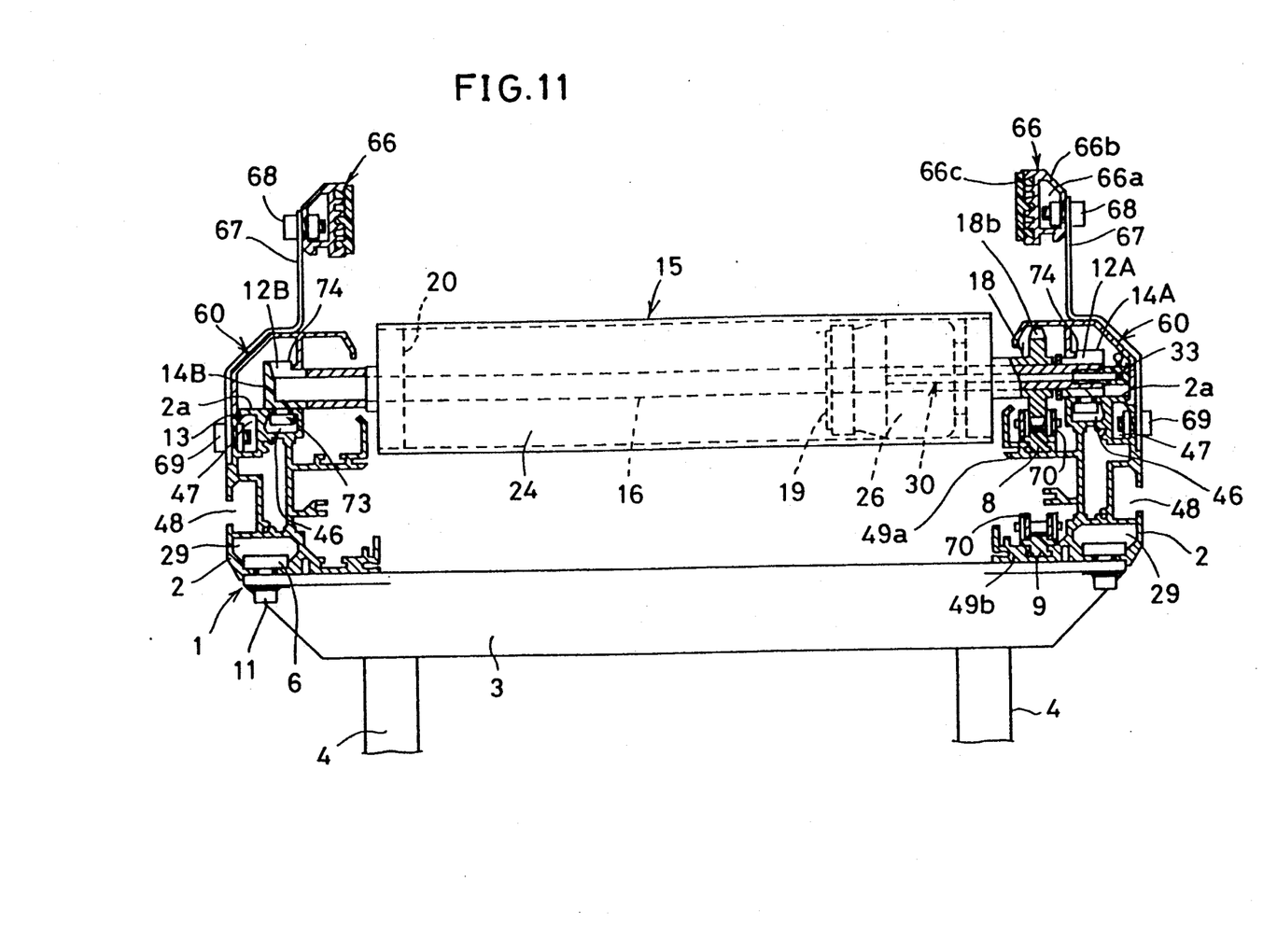
FIG. 11 is a front view, in longitudinal section, of said driven roller conveyor.

In FIG. 11, two side frames 2, which are made of aluminum, each have a first dovetail groove 29 formed in the lower end, said side frames 2 being connected to a base frame 3 by plate nuts 6 slidably fitted in said first dovetail grooves 29 and bolts 11 screwed into said plate nuts. Each side frame 2 is formed at its upper end with a second top-opened dovetail groove 45, at its outer upper region with a third outwardly opened dovetail groove 47 and at its outer lower region with a fourth outwardly opened dovetail groove 48. Further, the inward surface of each side frame 2 is formed with a pair of vertically spaced rail supports 49a and 49b extending lengthwise of the frame, said rail supports 49a and 49b supporting guide rails 8 and 9. The upper outer surface of each side frame 2 is formed with an outwardly opened cover engaging groove 13.

As shown in FIGS. 7 through 11, brackets 14A and 14B of synthetic resin are disposed at a plurality of places spaced apart lengthwise of the conveyor frame 1. The brackets 14A and 14B have front and rear ¼-arc top surfaces as seen side view, the lower ends of such arcs being continued to define front and rear projections 71 integrally dependent therefrom at opposite ends of the bottom surface. These projections 71 are rectangular and adapted to be closely fitted in slit-like openings in said second dovetail grooves 46 from above with the direction of their length being orthogonal to the direction of the length of the conveyor frame 1.

The brackets 14A and 14B are formed with vertical through-holes 72 adjacent one of their respective projections 71, i.e., the front projection 71 in the bracket 14A and the rear projection 71 in the bracket 14B. The brackets 14A and 14B are removably fixed to the side frames 2 by fasteners 73 displaceably (or slidably) in the direction of the length of the frames. Each fastener 73 consists of a nut 6 disposed in said second dovetail groove 46 and a bolt 11 inserted from above into said through-hole and screwed into said nut 6.

One bracket 14A is formed with a recess-shaped support 12A adapted to support a roller shaft (to be later described) which is to be dropped thereinto from above, said support 12A being opened upward, inward and outward, while the other bracket 14B is formed with a recess-shaped support 12B adapted to support another roller shaft which is to be dropped thereinto from above, said support 12B being opened upward and inward. In addition, one recess-shaped support 12A is formed with a vertical restriction surface 12a. The brackets 14A and 14B are formed at their upper surfaces with cover locking steps 74, the lower level being on the inner side.

A roller 15 is disposed between the opposed brackets 14A and 14B. That is, the opposite ends of the roller shaft 16 are dropped from above into the recess-shaped supports 12A and 12B, whereby the roller shaft 16 is supported in the frame 1 by the brackets 14A and 14B. In this case, a cut surface 16a formed on one end of the roller shaft 16 comes in surface contact with the restriction surface 12a, whereby the roller shaft 16 is nonrotatably supported.

A driven section 18 and a sleeve member 19 are freely rotatably fitted on one end of the roller shaft 16 with the driven section 18 disposed on the outer side (one end side). That is, the driven section 18 comprises a sleeve 18a freely rotatably supported on one end of the roller shaft 16 through a bearing device 20, and a sprocket 18b integral with one end of the said sleeve 18a. The sleeve member 19 is freely rotatably supported on the roller shaft 16 through a bearing device 20. The sleeve member 19 is separate from the driven section 18 and freely rotatable independently of the latter and a spacer 23 is interposed therebetween.

A sleeve-like roller body 24 is freely rotatably fitted on said driven section 18 and the other end of the roller shaft 16. That is, bearing devices 20 are disposed at the sleeve 18a of the driven section 18 and at the other end of the roller shaft 16, and the roller body 24 is fitted on these bearing devices to extend therebetween.

Fitted on the sleeve member 19 is a rubber tube 26, which is an example of a flexible body adapted to contact the inner surface 24a of the roller body 24 when contracted and to press against the inner surface 24a of the roller body 24 and the outer surface 18a of the driven section 18 when expanded. That is, the rubber tube 26 is fitted at one end thereof on one end of the sleeve member 19 and fixed thereon by a band 27 and turned inside out toward the other end of said sleeve member and fitted at the other end thereof on the other end of the sleeve member 19 and fixed therein by a band 27, with the turned-back end being disposed adjacent the driven section 18 and integral with the sleeve member 19, thus forming a pressing chamber 28.

A fluid feed and delivery passage 30 which opens to the pressing chamber 28 is formed to extend from the roller shaft 16 to the sleeve member 19. That is, the fluid feed and delivery passage 30 comprises a shaft channel 30a extending centrally through the roller shaft from one end to the intermediate region thereof and radially opening, an annular channel 30b formed in the inner surface of the sleeve member 19 to ensure permanent communication of said shaft channel 30a therewith, and a sleeve channel 30c formed in the sleeve member 19 to communicate the annular channel 30b with the pressing chamber 28.

A seal device 31 is disposed in the sleeve member 19 to define the annular channel 30b which is part of the fluid feed and delivery passage 30. The seal device 31 is formed with a through-hole 32 which establishes fluid communication between the annular channel 30b and the sleeve channel 30c. Further, the seal device 31 is in the form of a flexible member fixed to the inner surface of the sleeve member 19 and pressed against and slidable on the outer surface of the roller shaft 16.

Figure 7:
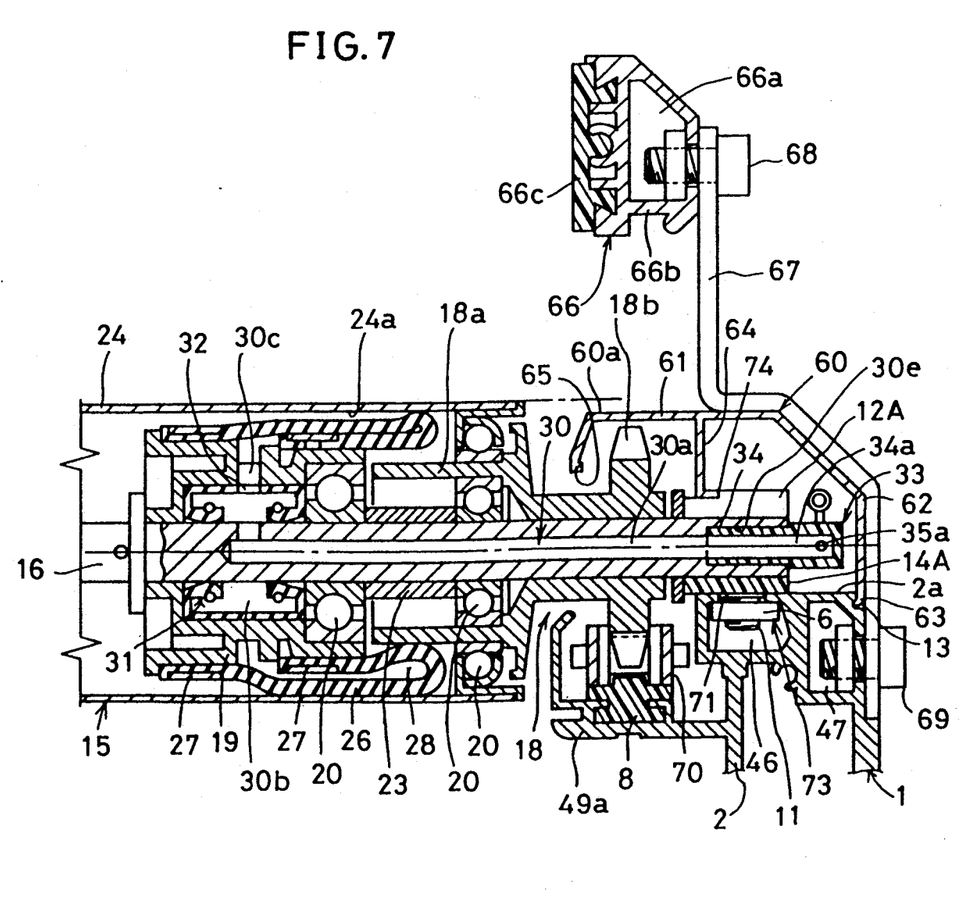
FIG. 7 is a front view, in longitudinal section, showing the vicinity of the driving member of a driven roller conveyor, showing still another embodiment of the invention.
Figure 8:
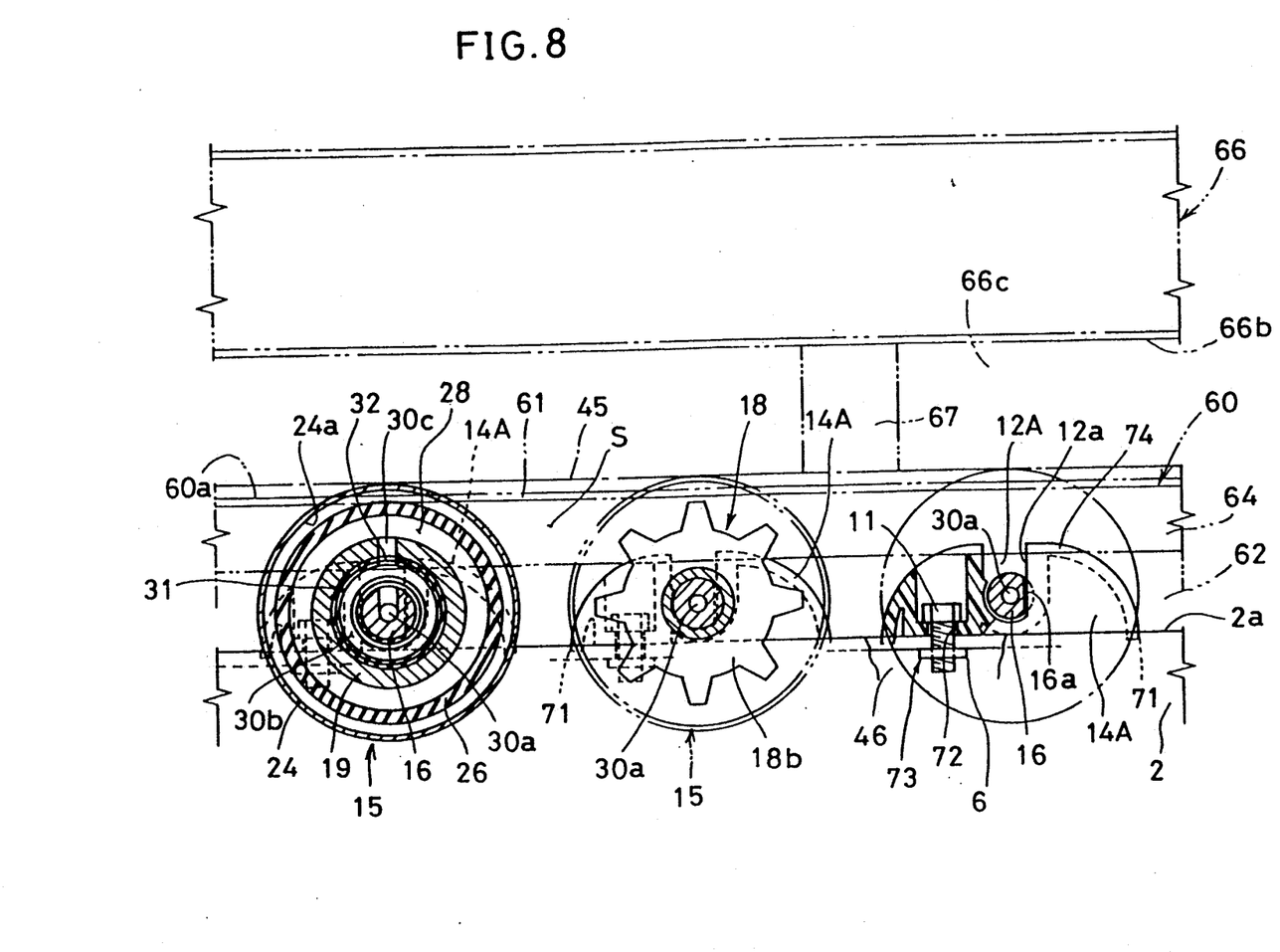
FIG. 8 is a fragmentary side view, of the driving side of said driven roller conveyor.
Figure 9:
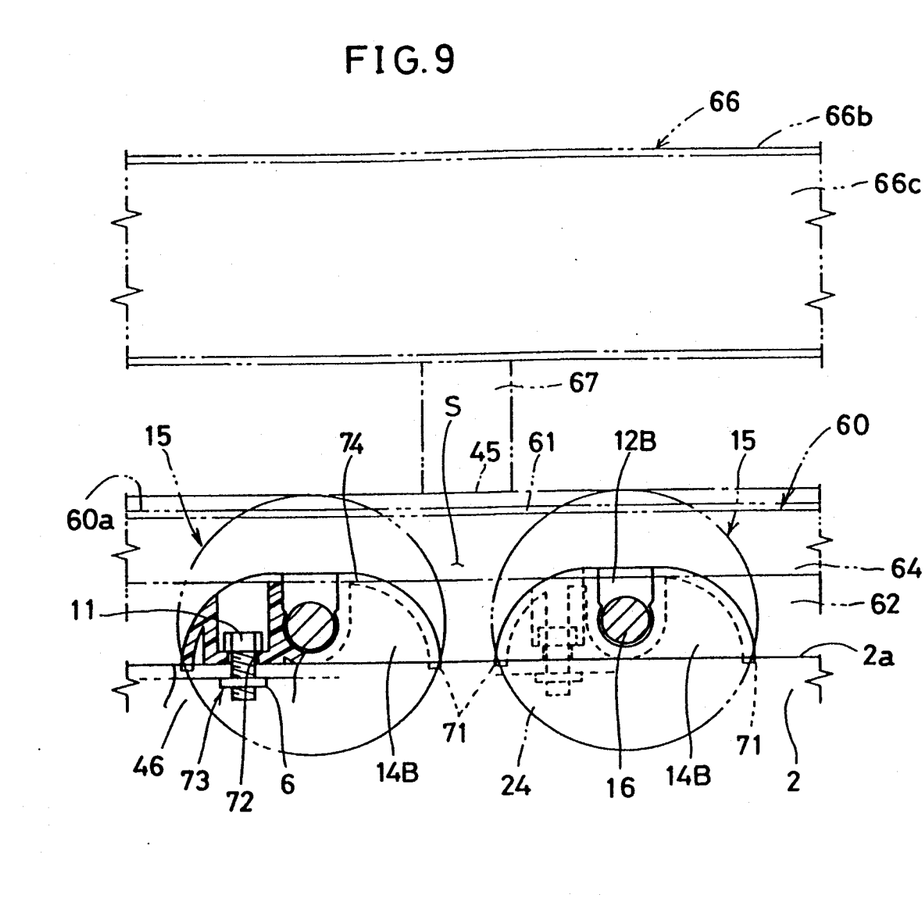
FIG. 9 is a fragmentary side view of the nondriven side of said driven roller conveyor.
Figure 10:
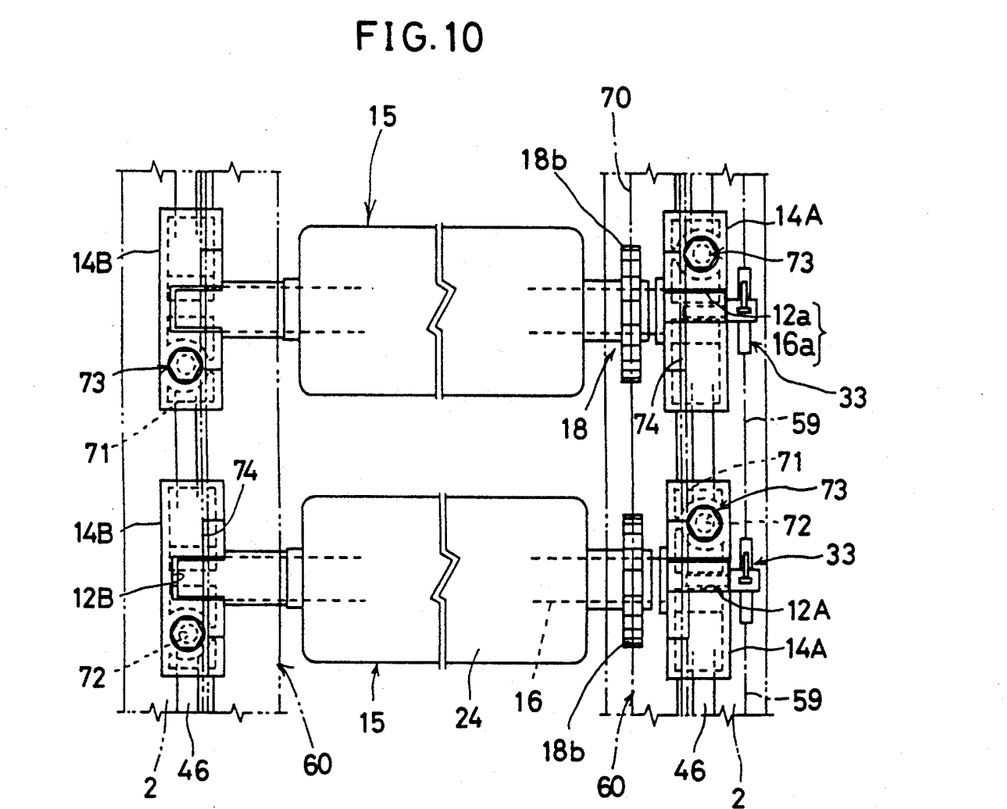
FIG. 10 is a fragmentary plan view of the principal portion of said driven roller conveyor.
Figure 12:
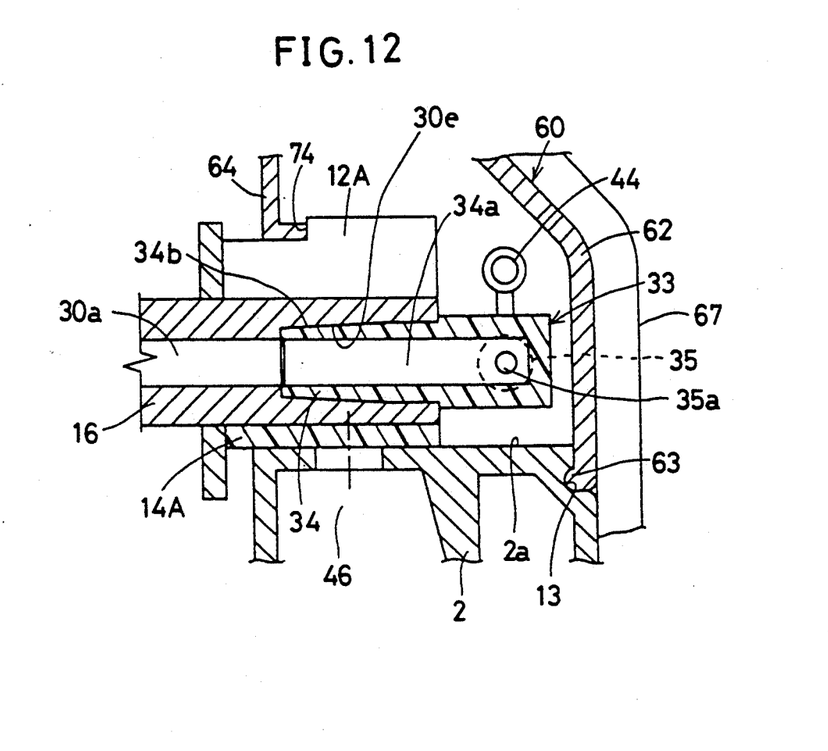
FIG. 12 is a front view, in longitudinal section, of the region where the fluid coupling is installed.
Figure 13:
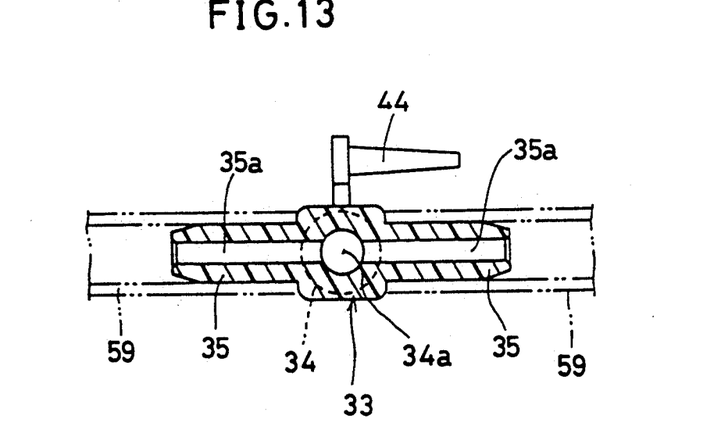
FIG. 13 is a side view, in longitudinal section, of the region where the fluid coupling is installed.

As shown in FIGS. 7, 12 and 13, the open portion of the fluid feed and delivery passage 30 at one end surface of said roller shaft 16 is formed as a connecting hole 30e having a greater diameter than that of the fluid feed and delivery passage 30. By utilizing the connecting hole 30e, a fluid coupling of resin is installed by axial insertion. That is, the fluid coupling 33 is T-shaped as seen in plan view, comprising an insert 34 forming a branch channel freely communicable with said shaft channel 30a, and a pair of connectors 35 forming main channels 35a communicating with the base end (outer end) of the branch channel 34a.

The fluid coupling is integrally formed with an operating portion 44 and the outer surface of the insert 34 is formed as a tapered surface 34b gradually decreasing in diameter toward the front end to ensure smooth and firm insertion into the connecting hole 30e. In addition, the adjacent connectors 35 of adjacent fluid couplings are interconnected by a hose 59.

As shown in FIGS. 7 through 11, the side frames 2 are respectively provided with cover members 60. These cover members 60 cover the ends of the roller shaft 16 from above, with one cover 60 also covering the driven section 18 from above.

Each cover member 60 is made of resin in inverted L shape having a top plate portion 61 and a side plate portion 62, the lower end of said side plate portion 62 being formed with an engaging portion adapted to elastically engage the cover engaging groove 13, said top plate portion 61 having an engaging plate portion 64 depending from the middle of the lower surface thereof, said engaging plate portion 64 being adapted to elastically engage said cover engaging step 74. The inner end of the top plate portion 61 is formed as a downwardly bent portion 65 entering between the sprocket 18b and the bearing device 20. The upper surface 60a of the cover member 60 is positioned below the level of the transport plane 45 (FIG. 8) defined by the group of rollers 15.

Disposed above the cover member 60 is a guide 66 extending throughout the length of the conveyor, said guide 66 being supported on the side frame 2 by supports 67 disposed at predetermined intervals. That is, the guide 66 comprises a rail portion 66b having an outwardly opened dovetail groove 66a, and a guide portion 66c of resin disposed on the inner surface of said rail portion 66b.

The support 67 is formed to extend along the outer surface of the cover member 60 and its upper portion is integrated with the rail portion 66b by fasteners 68 utilizing the dovetail groove 66a. The lower portion of the support 67 abuts against the upper outer surface of the side frame 2 and is integrated with the latter by fasteners 69 utilizing the third dovetail groove 47. The fasteners 68 and 69 are bolts and nuts or the like.

During transport, the load on the roller body 24 repetitively changes but the roller shaft 16 is supported by the side frames 2 through brackets 14A and 14B and the load is not transmitted to the fluid coupling 3. Therefore, the seal state in the region where the insert 34 is inserted in the roller shaft 16 does not change. Thus, the seal state is satisfactorily maintained for a long time.

During transport, moment forces are produced in the brackets 14A and 14B through the roller shaft 16 by the frictional force acting on the roller 15 but such moment forces can be resisted in that two projections 71 are fitted in the second dovetail groove 46. Therefore, although the brackets 14A and 14B are fixed in position by their respective single fasteners 71, the moment force which tends to be produced in the case of one-point fixing can be resisted. In the driven roller conveyor constructed in the manner described above and used for transport, the position of the roller shaft 16 is above the level of the upper surface 2a (FIG. 7) of the side frame 2, with a large space S (FIG. 8) defined between the upper surface 2a of the side frame and the transport plane 45 defined by the group of rollers 15.

In the above embodiment, the brackets 14A and 14B disposed on the side frames 2 have been fixed to the side frames 2 by utilizing the second top-opened dovetail grooves 46. However, they may be fixed in position by utilizing side-opened dovetail grooves formed in the upper lateral regions of the side frames 2. In this case, the brackets 14A and 14B disposed on the side frames 2 have dependent portions opposed to dovetail grooves, and fasteners 73 are used by utilizing said dependent portions.

In the above embodiment, the construction for transmitting the power from the chain 70 to the roller body 24 has been shown as the type in which the rubber tube 26 is expanded to press against the inner surface 24a of the roller body and the outer surface 18a of the driven section. However, it is possible to use a type in which the roller shaft 16 is constructed as rotatable type, with a fluid coupling 33 of rotary joint type inserted in the roller shaft 16 and with the rubber tube 26 attached to the roller shaft 16. Further, it is possible to use a type in which a transmission device comprising a driven chain and a transmission roller is disposed between the roller body 24 and the chain 70 or a type in which a sprocket 18b is fixed to a roller shaft 16 of rotatable type.

As shown in the above embodiment, by attaching the cover member 60 to extend from one side frame 2 to the bracket 14A, this cover 60 can be firmly fixed in position. However, depending upon the fixing type or cover type, such cover member 60 may be attached to the side frame 2 alone or to the bracket 14A alone. Further, the other cover member 60 may be removed.

What is claimed is:

1. A roller for a roller conveyor comprising a driven section freely rotatably fitted on one end of a roller shaft supported in a frame, a sleeve member freely rotatably supported on said one end through a seal device, a roller body freely rotatably supported between said driven section and the other end of said roller shaft, an expandable and contractible flexible body mounted on said sleeve member and adapted to contact the inner surface of the roller body when contracted and when expanded to press against both the inner surface of the roller body and the driven section, and a fluid feed and delivery passage which opens to the interior of said flexible body for supplying fluid to said flexible body for expanding and contacting said flexible body, said fluid feed and delivery passage extending from said roller shaft to the sleeve member.

2. A roller for a roller conveyor as set forth in claim 1, characterized in that said fluid feed and delivery passage has an opening at least at one end surface of the roller shaft and a fluid coupling is attached to the roller shaft by being axially inserted into said opening.

* * * * *